United States Patent [19]

Terajima

[11] Patent Number: 5,594,168
[45] Date of Patent: Jan. 14, 1997

[54] VIBRATION CONTROL APPARATUS HAVING OSCILLATION FREQUENCY REGULATION

[75] Inventor: Kokichi Terajima, Tokyo, Japan

[73] Assignee: Akai Electric Co., Tokyo, Japan

[21] Appl. No.: 371,026

[22] Filed: Jan. 10, 1995

[30] Foreign Application Priority Data

Aug. 10, 1994 [JP] Japan .................................. 6-188403
Aug. 30, 1994 [JP] Japan .................................. 6-205405

[51] Int. Cl.⁶ .............................. G01P 9/04; H01L 41/08
[52] U.S. Cl. ...................... 73/496; 73/504.12; 310/316
[58] Field of Search .............................. 73/496, 504.12, 73/504.14; 310/316, 320, 321, 319; 324/125

[56] References Cited

U.S. PATENT DOCUMENTS

| | | | |
|---|---|---|---|
| 5,197,331 | 3/1993 | Oikawa | 73/504.12 |
| 5,270,607 | 12/1993 | Terajima | 73/504.12 |
| 5,349,857 | 9/1994 | Kasanami et al. | 73/504.14 |
| 5,434,467 | 7/1995 | Abe et al. | 73/504.12 |

FOREIGN PATENT DOCUMENTS 0517259 12/1992 European Pat. Off. .
05071968 3/1993 Japan .
05060562 3/1993 Japan .

Primary Examiner—Hezron E. Williams
Assistant Examiner—Helen C. Kwok
Attorney, Agent, or Firm—Meltzer, Lippe, Goldstein, et al.

[57] ABSTRACT

A vibration control apparatus that can impart self-induced vibration by stabilizing the vibrator at a frequency in near agreement with its mechanical resonance frequency vibration $f_s$ is provided. A vibrator has a pair of piezo-electric elements on the side surface of vibration member having a resonance point. A drive apparatus has signal output terminal that outputs the drive signal of vibrator. First and second feedback amplifiers each have feedback input terminals. A third feedback amplifier has a feedback input terminal and a signal input terminal. The feedback input terminals of the first and second feedback amplifiers are connected to one electrode of each of the piezo-electric elements. The feedback input terminal of the third feedback amplifier is connected to the other electrodes of the pair of piezo-electric elements. The signal input terminal is connected to signal output terminal of drive apparatus. A signal based on the output signal of third feedback amplifier is fed back to the drive apparatus to impart self-induced vibration to the vibrator.

25 Claims, 16 Drawing Sheets

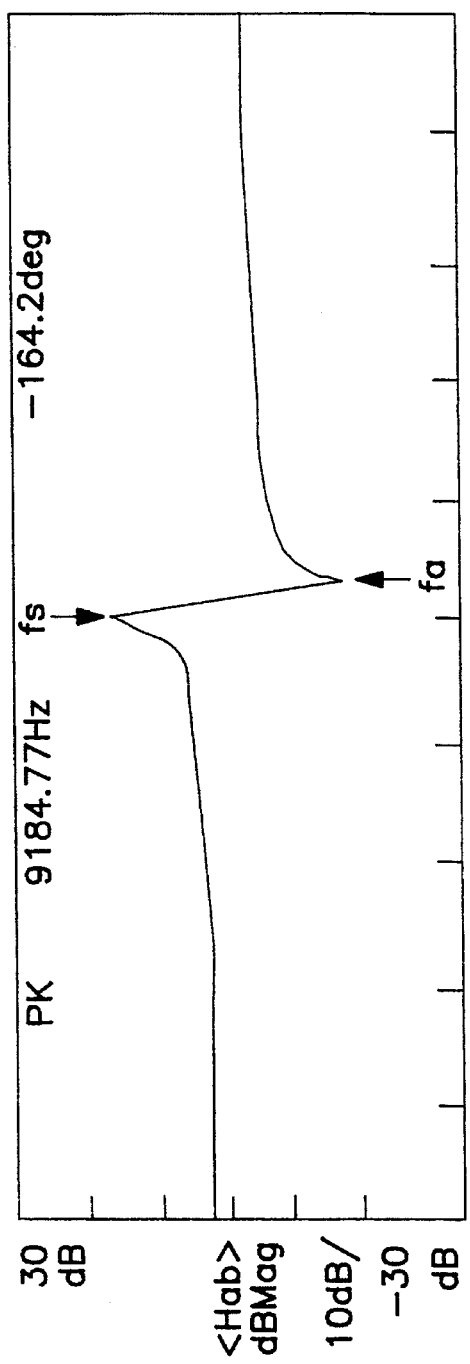
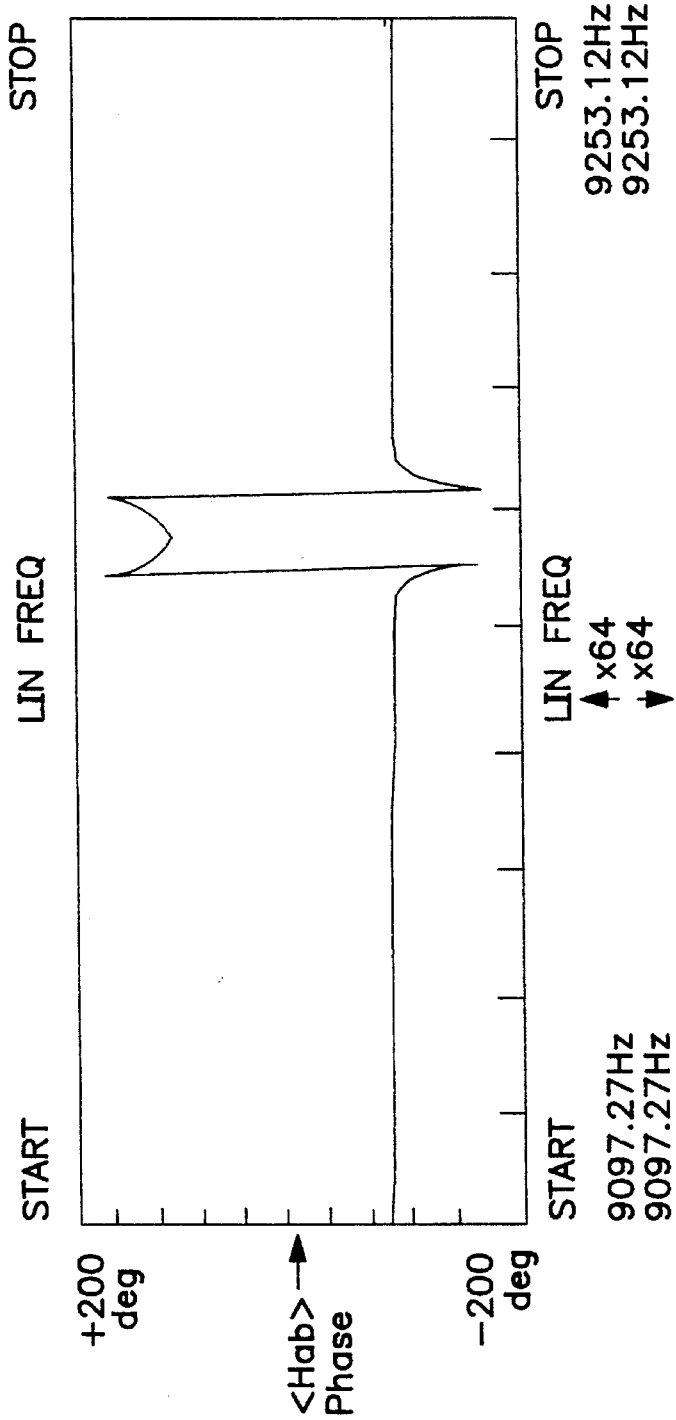
FIG.19A
FIG. 19B

VIBRATION CONTROL APPARATUS HAVING OSCILLATION FREQUENCY REGULATION

RELATED APPLICATIONS

The following related patent applications have been filed concurrently in the United States Patent and Trademark office and are hereby incorporated by reference:

VIBRATION CONTROL APPARATUS HAVING AUTOMATIC GAIN CONTROL, to K. Terajima, claiming priority of Japanese Patent Application Nos.: 6-153953 and 6-168142;

VIBRATION CONTROL DEVICE FOR SAFELY INDUCED VIBRATION OF GYROSCOPES to K. Terajima, claiming priority of Japanese Patent Application Nos.; 6-5364, 6-157493, 6-10348 and 6-168141; and ANGULAR VELOCITY DETECTION CIRCUIT FOR VIBRATORY GYROSCOPES to K. Terajima et al., claiming priority of Japanese Patent Application Nos.: 6-50103.

FIELD OF THE INVENTION

The present invention relates to a vibration control apparatus used in a piezo-electric type vibrating gyroscope.

BACKGROUND OF THE INVENTION

A conventional vibrating gyroscope is illustrated in FIG. 11. In this vibrating gyroscope, piezo-electric elements 2 and 3 of vibrator 4 are respectively connected via the respective impedance elements Z1 and Z2 to the output side of drive apparatus 6. The output side of this drive apparatus 6 is also connected, via still another impedance element Z3, to capacitor C. Drive signals from drive apparatus 6 are simultaneously applied to the piezo-electric elements 2 and 3 and on capacitor C.

The outputs at the respective nodes of impedance elements Z1 and Z2 and piezo-electric elements 2 and 3 are combined. The combined output and the output at the node of impedance element Z3 and capacitor C are supplied to differential amplifier 7. The differential output from differential amplifier 7 is fed back to drive apparatus 6, so that vibrator 4 is self-vibrating. The outputs at the respective nodes of impedance elements Z1 and Z2 and piezo-electric elements 2 and 3 are supplied to another differential amplifier 8, so as to obtain an angular velocity to detection signal based on the output from differential amplifier 8.

An example of the vibrator 4, shown in FIG. 12, has a square cross-sectional shape and has piezo-electric element 2 on one side surface 1a of vibration member 1 having a resonance point and piezo-electric element 3 on another side surface 1b adjoining side surface 1a. Another example of a vibrator, shown in FIG. 13 has piezo-electric elements 2 and 3 split in the wide direction on the same side of vibration member 1. Another example of a vibrator, shown in FIG. 14, has piezo-electric elements 2 and 3 on opposite sides of vibration member 1. Another example of a vibrator, shown in FIG. 15, has the respective piezo-electric elements 2a and 2b on opposite side surfaces of vibration member 1 and connects them in parallel so that they act essentially as one piezo-electric element 2, while also having the respective piezo-electric elements 3a and 3b on the other opposite sides so as to connect them in parallel so that they act essentially as one piezo-electric element 3.

Still another example of vibrator 4, shown in FIG. 16, has a triangular cross-sectional shape and has piezo-electric elements 2 and 3 on two side surfaces of vibration member 1 having a resonance point. Another example of a vibrator 4, shown in FIG. 17, has a circular cross-sectional shape and has piezo-electric elements 2 and 3 on the peripheral surface of vibrator member 1 having a resonance point. Thus, members having essentially two piezo-electric elements are formed on the side surfaces of vibration members having various sectional shapes. Further, a vibrator 4 made up of at least two piezo-electric elements 2 and 3 in vibration member 1, as illustrated in FIG. 12 to FIG. 17, is equivalently represented as shown in FIG. 18.

However, the conventional vibration gyroscope shown in FIG. 11 applies the drive signals from drive apparatus 6 onto piezo-electric elements 2 and 3 via impedance elements Z1 and Z2. This causes the signal level applied to piezo-electric elements 2 and 3 to drop when the impedances of piezo-electric elements 2 and 3 drop in the vicinity of the mechanical series resonance frequency $f_s$ in vibrator 4. The frequency at which the output from differential amplifier 7 is at a maximum and the mechanical series resonance frequency $f_s$ do not coincide. This phenomenon will be explained next, with reference to FIG. 19 and FIG. 20.

FIGS. 19A and B illustrate examples of measurements of the frequency and phase characteristics of admittance |Y| of vibrator 4 as shown in FIG. 12. FIGS. 20 A and B show the transfer and phase characteristics of differential amplifier 7. The vibration gyroscope illustrated in FIG. 11 connects piezo-electric elements 2 and 3 directly to the respective impedances Z1 and Z2, so that, as will be understood from FIG. 19A, the signal levels applied to these piezo-electric elements 2 and 3 decrease in the vicinity of the mechanical series resonance frequency $f_s$ where |Y| is large and increase in the vicinity of the mechanical parallel resonance frequency $f_s$ where |Y| is small. Therefore, the output of differential amplifier 7 receives the effect of the mechanical parallel resonance frequency $f_a$ with its high signal level. Therefore, the maximum value frequency, as shown in FIG. 20A, shifts to the mechanical parallel-resonance frequency $f_a$.

As the equivalent circuit in FIG. 21 indicates, vibrator 4 is shown with one piezo-electric element as a parallel resonance circuit where damping capacity Cd is connected in parallel to the series resonance circuit comprising inductor L1, capacitor C1 and resistance R1. Resistances and capacitors, for example, are used for impedance elements Z1 and Z2. When resistances are used as impedance elements Z1 and Z2, the applied signals also create phase changes determined by the value of damping capacity Cd relative to the resistance values of impedance elements Z1 and Z2. Therefore, the levels and phases of the applied signals vary in a complex fashion along with impedance changes in vibrator 4. The frequency where the output of differential amplifier 7 is at a maximum goes to the mechanical parallel resonance frequency $f_a$.

Furthermore, the equivalent constants of vibrator 4, i.e., damping capacity Cd, inductor L1, capacitor C1 and resistance $R_1$, have individual temperature dependencies, so that the frequencies where the output of differential amplifier 7 is at a maximum will vary under changes in ambient temperature. Since self-induced vibration occurs at frequencies where the output of differential amplifier 7 is at a maximum, variations in set frequencies of self-induced vibration are easily brought about by changes in ambient temperature.

The mechanical quality coefficient $Q_m$ of vibrator 4 is such that there will be no accurate agreement between the values on the piezo-electric element 2 side and the values on the piezo-electric element 3 side, so that variations in the set frequencies of self-induced vibration cause differences in the outputs of impedance elements Z1 and Z2 and the nodes of piezo-electric elements 2 and 3, so that low voltages and variations tend to occur.

Vibrator 4 has impedance elements Z1 and Z2 connected to piezo-electric elements 2 and 3 which leads to overall high impedance, so that the effects of electrical noise tend to occur at the respective nodes of piezo-electric elements 2 and 3 and impedance elements Z1 and Z2.

Furthermore, in order to cause the vibrator to oscillate at or near its resonance frequency, i.e., self-induced vibration, the prior vibration gyroscope shown in FIG. 11 combines the outputs at the respective nodes of impedance elements Z1 and Z2 and piezo-electric elements 2 and 3. It also supplies this combined out put and the outputs at the nodes of impedance element Z3 and capacitor C to the differential amplifier 7. This leads to the problematic necessity of a large number of parts and high costs, as well as to complicating the circuit structure and hindering miniaturization.

SUMMARY OF THE INVENTION

A first object of the invention is to provide a vibration control apparatus wherein the vibrator can be given self-induced vibration by stabilizing it at a frequency in near agreement with the mechanical series resonance frequency $f_s$.

A second object of the invention is to provide a vibrator having self-induced vibration by stabilizing it at a frequency in near agreement with the mechanical series resonance frequency $f_s$ and which is capable of effectively reducing low voltage.

A third object of the invention is to provide a vibration control apparatus wherein the vibrator can be given self-induced vibration by stabilizing it at a frequency in accurate agreement with the mechanical series resonance frequency $f_s$.

A fourth object of the invention is to provide a vibration control wherein the vibrator can be given self-induced vibration by stabilizing it at a frequency in accurate agreement with the mechanical series resonance frequency $f_s$ and which is also capable of effectively reducing low voltage and its variations.

In order to achieve the first object, a first embodiment of the invention comprises a vibrator having a vibration member having a side surface with a resonance point, at least one pair of piezo-electric elements on the side surface, each piezo-electric element having at least two electrodes, a drive apparatus having a signal output terminal that outputs the vibrator drive signal, first and second feedback amplifiers, each having a feedback input terminal, and a third feedback amplifier having a feedback input terminal and a signal input terminal. The feedback input terminal of the first feedback amplifier is connected to one electrode of one piezo-electric element and the feedback input terminal of the second feedback input terminal is connected to one electrode of the other piezo-electric element. The feedback input terminal of the third feedback amplifier is connected to the other electrodes of the pair of piezo-electric elements. The signal input terminal of the third feedback amplifier is connected to the signal output terminal of the drive apparatus. A signal based on the output signal of the third feedback amplifier is fed back to the drive apparatus. The signal fed back to the drive apparatus reaches its maximum at a frequency in near agreement with the mechanical resonance frequency of the vibrator. Consequently, it is possible to impart self-induced vibration to the vibrator at a frequency in near agreement with its mechanical resonance frequency. In other words, the vibrator is oscillating at or near its resonance frequency.

In a second embodiment of the invention, which can achieve the second object, the feedback input terminal of the first feedback amplifier is connected to one electrode of one piezo-electric element and the feedback input terminal of the second feedback amplifier is connected to one electrode of the other piezo-electric element. The feedback input terminal of the third feedback amplifier is connected to the other electrodes of the pair of piezo-electric elements. The signal input terminal of the third feedback amplifier is connected to the signal output terminal of the drive apparatus. A signal based on the output signal of the third feedback amplifier is fed back to the drive apparatus and is also supplied to the feedback input terminals of the first and second feedback amplifiers. Therefore, not only can the vibrator be made to operate stabilized at near its self-induced vibration frequency, but it is also possible to compensate for the equivalent resistance difference of the pair of piezo-electric elements and to effectively decrease the difference in the outputs of the first and second feedback amplifiers, i.e., to decrease low voltage.

In a third embodiment of the present invention, which can achieve the third object, the drive apparatus has a signal output terminal that outputs the vibrator drive signal and a compensation signal output terminal that outputs a compensation signal for the damping capacity of the vibrator. The feedback input terminal of the first feedback amplifier is connected to one electrode of one piezo-electric element and the feedback input terminal of the second feedback amplifier is connected to one electrode of the other piezo-electric element. The feedback input terminal of the third feedback amplifier is connected to the other electrodes of the pair of piezo-electric elements and to the compensation signal output terminal of the drive apparatus. The signal input terminal of the third feedback amplifier is connected to the signal output terminal of the drive apparatus. A signal based on the output signal of the third feedback amplifier is fed back to the drive apparatus.

Therefore, the signal fed back to the drive apparatus maximizes at a frequency in accurate agreement with the mechanical resonance frequency of the vibrator. Consequently, it is possible to impart self-induced vibration to the vibrator at a frequency in accurate agreement with its mechanical resonance frequency.

In a fourth embodiment of the present invention, which can achieve the fourth object, the feedback input terminal of the first feedback amplifier is connected to one electrode of one piezo-electric element and the feedback input terminal of the second feedback amplifier is connected to one electrode of the other piezo-electric element. The feedback input terminal of the third feedback amplifier is connected to the other electrodes of the pair of piezo-electric elements and to the compensation signal output terminal of the drive apparatus. The signal input terminal of the third feedback amplifier is connected to the signal output terminal of the drive apparatus. A signal based on the output signal of the third feedback amplifier is fed back to the drive apparatus and is also supplied to the feedback input terminals of the first and second feedback amplifiers. Therefore, not only can the vibrator be made to operate stabilized at its self-induced vibration frequency, but it is also possible to compensate for the equivalent resistance difference of the pair of piezo-electric elements and to effectively decrease the difference in the outputs of the first and second feedback amplifiers and, thus, to decrease low voltage and variations.

In another embodiment of the invention, the signal based on the output signal of the third feedback amplifier can be formed by combining the output signal of the third feedback amplifier with the drive signal.

In another embodiment of the invention, the signal based on the output signal of the third feedback amplifier can be formed by combining the output signal of the third feedback amplifier with the compensation signal.

In a preferred embodiment, the amplitude and phase of the compensation signal vary in correspondence with the value of the damping capacity of the vibrator from the standpoint of more is accurate compensation for the damping capacity of the vibrator.

In a preferred embodiment, the signal based on the output signal of the third feedback amplifier is supplied to the feedback input terminals of the first and second feedback amplifiers via a variable resistance. At least one of the feedback resistances of the first and second feedback amplifiers is a variable feedback resistance, from the standpoint of supplementing the mutual equivalent resistance difference and damping capacity difference of the pair of piezo-electric elements and effectively preventing formation of low voltage.

In another preferred embodiment, a differential amplifier that detects differences in the outputs of the first and second feedback amplifiers so as to detect angular velocity is provided.

In order to provide a simple, low cost and miniaturized vibrating gyroscope yet another embodiment is provided. In this embodiment of the invention, the vibrating gyroscope comprises a vibrator formed from a pair of piezo-electric elements on the side surface of a vibration member having a resonance point. One of the electrodes of each piezo-electric elements is connected to a drive circuit for self-induced excitation of the vibrator. The other electrodes are connected to a detection circuit for detecting input angular velocity.

A piezo-electric element, as illustrated by the equivalent circuit in FIG. 21, is represented as a parallel resonance circuit comprising damping capacity Cd connected in parallel to a series resonance circuit which comprises an inductor $L_1$, capacitor $C_1$ and a resistance $R_1$, and where the series resonance frequency becomes $$\omega L_1 = 1/\omega C_1,$$

thereby making a parallel circuit of resistance $R_1$ and damping capacity Cd which shows extremely little impedance.

Consequently, when one of the electrodes of each piezo-electric element is connected to a drive circuit for self-induced vibration of the vibrator, it becomes possible to have self-induced vibration at the vibrator without a complex combination of signals as done in conventional systems. The drive circuit may also have an oscillation circuit. The amplification degree of the oscillation circuit is increased and the impedance of the pair of piezo-electric elements is made extremely small. Since the current flowing in the pair of piezo-electric elements changes in accordance with input angular velocity, when the other electrodes of the piezo-electric elements are connected to a detection circuit for detecting input angular velocity, it becomes possible to detect input angular velocity based on such current changes.

BRIEF DESCRIPTION OF THE DRAWINGS

FIGS. 19A and 19B illustrate examples of measurements of the frequency and phase characteristics of the admittance of the vibrator.

DETAILED DESCRIPTION OF THE INVENTION

The invention will next be explained by examples, with reference to the drawings. The reference numbers are the same for the same parts described in the Background section.

Figure 1:
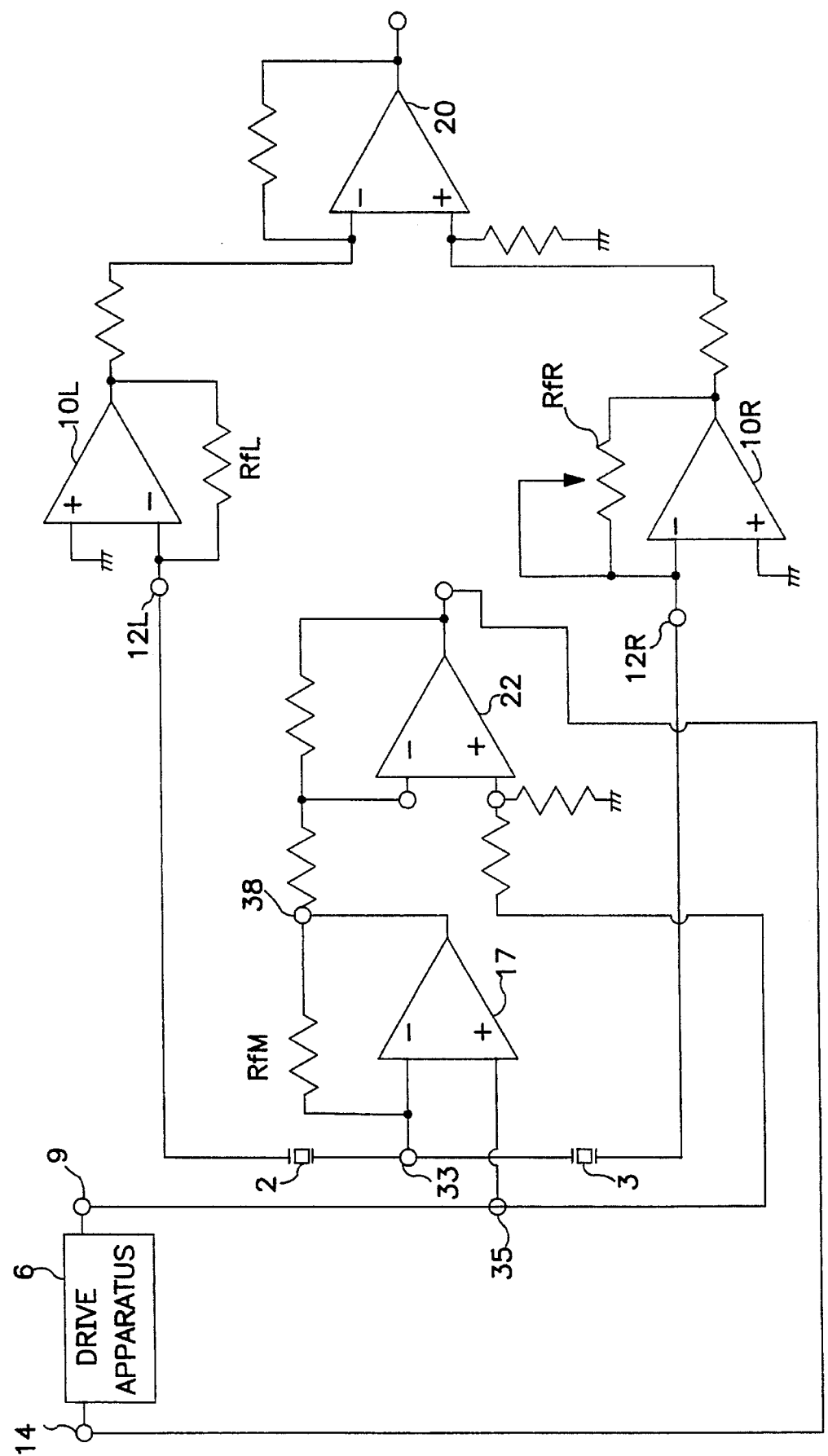
FIG. 1 illustrates Example 1 of the invention.

FIG. 1 illustrates Example 1 of the invention, as applied to a vibrating gyroscope that detects angular velocity. Vibrators 4 having at least two piezo-electric elements 2 and 3 on the side surfaces of vibration members 1 having various cross-sectional shapes and resonance points, as shown in FIGS. 12 to 17, are given controlled vibration.

In FIG. 1, one electrode each of piezo-electric elements 2 and 3 is connected to feedback input terminals 12L and 12R of first and second feedback amplifiers 10L and 10R, respectively. The other electrodes are connected to feedback input terminal 33 of a third feedback amplifier 17. Signal input terminal 35 of the third feedback amplifier 17 is connected to signal output terminal 9 of the drive apparatus 6. The drive signal of drive apparatus 6 is output at terminal 9 to drive vibrator 4. Output terminal 38 of the third feedback amplifier 17 is connected to the inverting input terminal of differential amplifier 22. The non-inverting input terminal of the differential amplifier 22 is connected to signal output terminal 9 of the drive apparatus 6. The difference between the output signal of third feedback amplifier 17 and the drive signal from drive apparatus 6 is detected at the differential amplifier 22. The output signal of the differential amplifier 22 is fed back to input terminal 14 of drive apparatus 6, so that vibrator 4 is given self-induced vibration. Also, the outputs of feedback amplifiers 10L and 10R are supplied to another differential amplifier 20, thus, the Coriolis force arising from the angular velocity acting on vibrator 4 is detected as voltage.

Further, feedback resistances $Rf_L$ and $Rf_R$ are respectively connected between the output sides of the first and second feedback amplifiers 10L and 10R and the corresponding feedback input terminals 12L and 12R. One of the feedback resistances, feedback resistance $Rf_R$ in this example, is a variable feedback resistance. Also, feedback resistance $Rf_M$ is connected between the output side of the third feedback amplifier 17 and its feedback input terminal 33.

According to this example, a signal fed back from differential amplifier 22 to drive apparatus 6 differs in phase by 180° from the signal output from drive apparatus 6 at signal output terminal 9. The signal output from differential amplifier 22 is based on the output signal of the third feedback amplifier 17. The amplitude of the signal output from differential amplifier 22 maximizes at a frequency in near agreement with the mechanical series resonance frequency of vibrator 4. Consequently, it is possible to impart self-induced vibration to the vibrator which is in near agreement with its mechanical series resonance frequency. Feedback resistance $Rf_R$ of second feedback amplifier 10R can be a variable feedback resistance. The difference in the outputs of the first and second feedback amplifiers 10L and 10R, i.e., the output of differential amplifier 20, goes to zero when there is no action from angular velocity. Consequently, it is possible to effectively decrease low voltage and to detect angular velocity at high accuracy.

Figure 2:
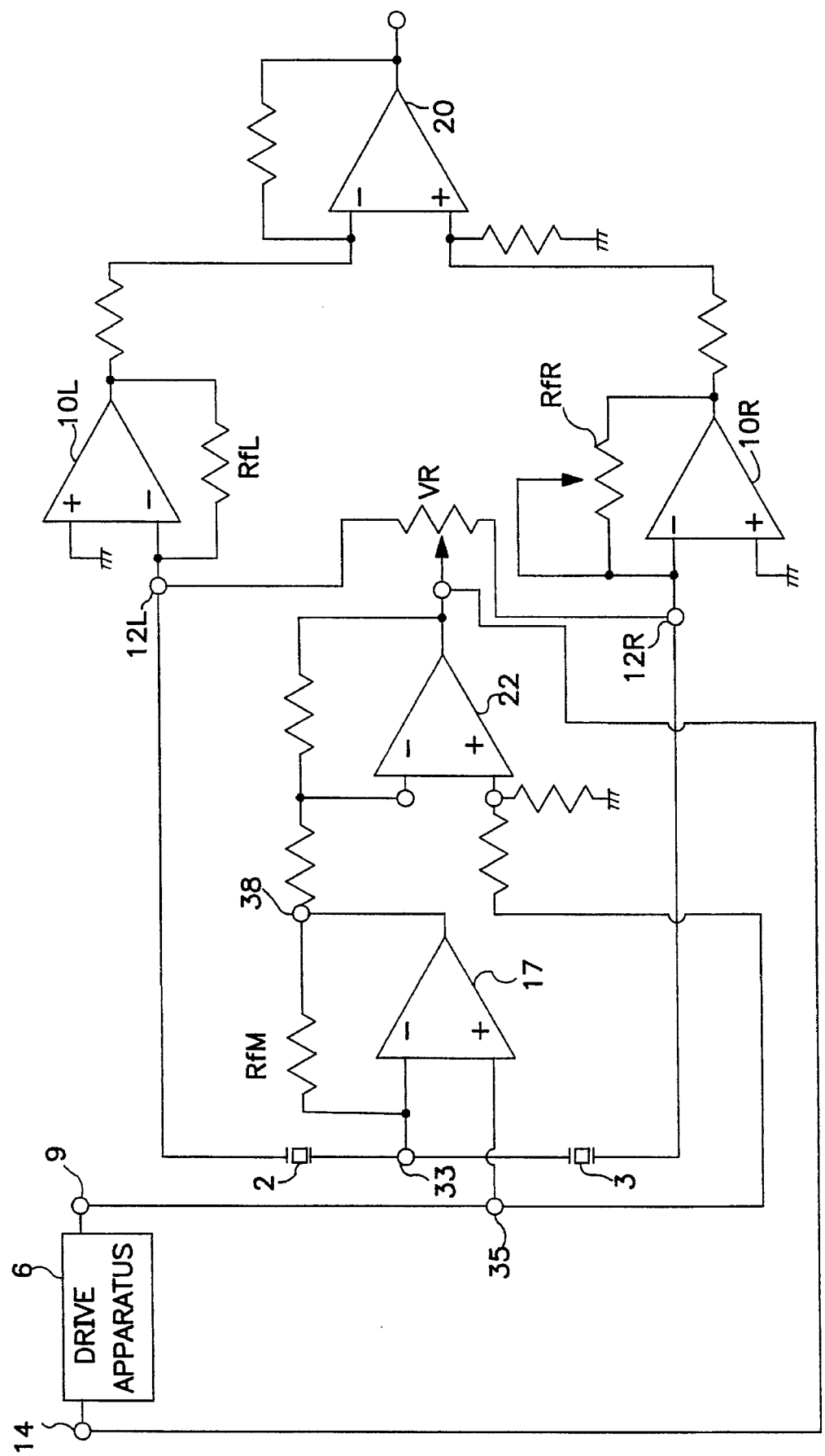
FIG. 2 illustrates Example 2 of the invention.

FIG. 2 illustrates Example 2 of the invention. This example differs from Example 1 in that the output of differential amplifier 22 is also supplied, via variable resistance VR, to feedback input terminals 12L and 12R of the first and second feedback amplifiers 10L and 10R.

Thus, when the output of differential amplifier 22, i.e., a signal whose phase differs 180° from the drive signal, is supplied via variable resistance VR to feedback, input terminals 12L and 12R of the first and second feedback amplifiers 10L and 10R, the mutual difference in the equivalent resistances of piezo-electric elements 2 and 3 is compensated for. A current corresponding to the Coriolis force, i.e., only the imaginary part of the current, can be made to flow in feedback resistance $Rf_L$ and variable feedback resistance $Rf_R$ of the first and second feedback amplifiers 10L and 10R. Furthermore, the imaginary parts of currents which flow in feedback resistance $Rf_L$ and variable feedback resistance $Rf_R$ can be made mutually equal, when there is no action from the angular velocity, by adjusting variable feedback resistance $Rf_R$. The mutual difference between the damping capacities of piezo-electric elements 2 and 3 can also be compensated for. Consequently, it is possible to suppress formation of low voltage in the output of differential amplifier 20 to a very small degree and to detect angular velocity at still higher accuracy.

Figure 3:
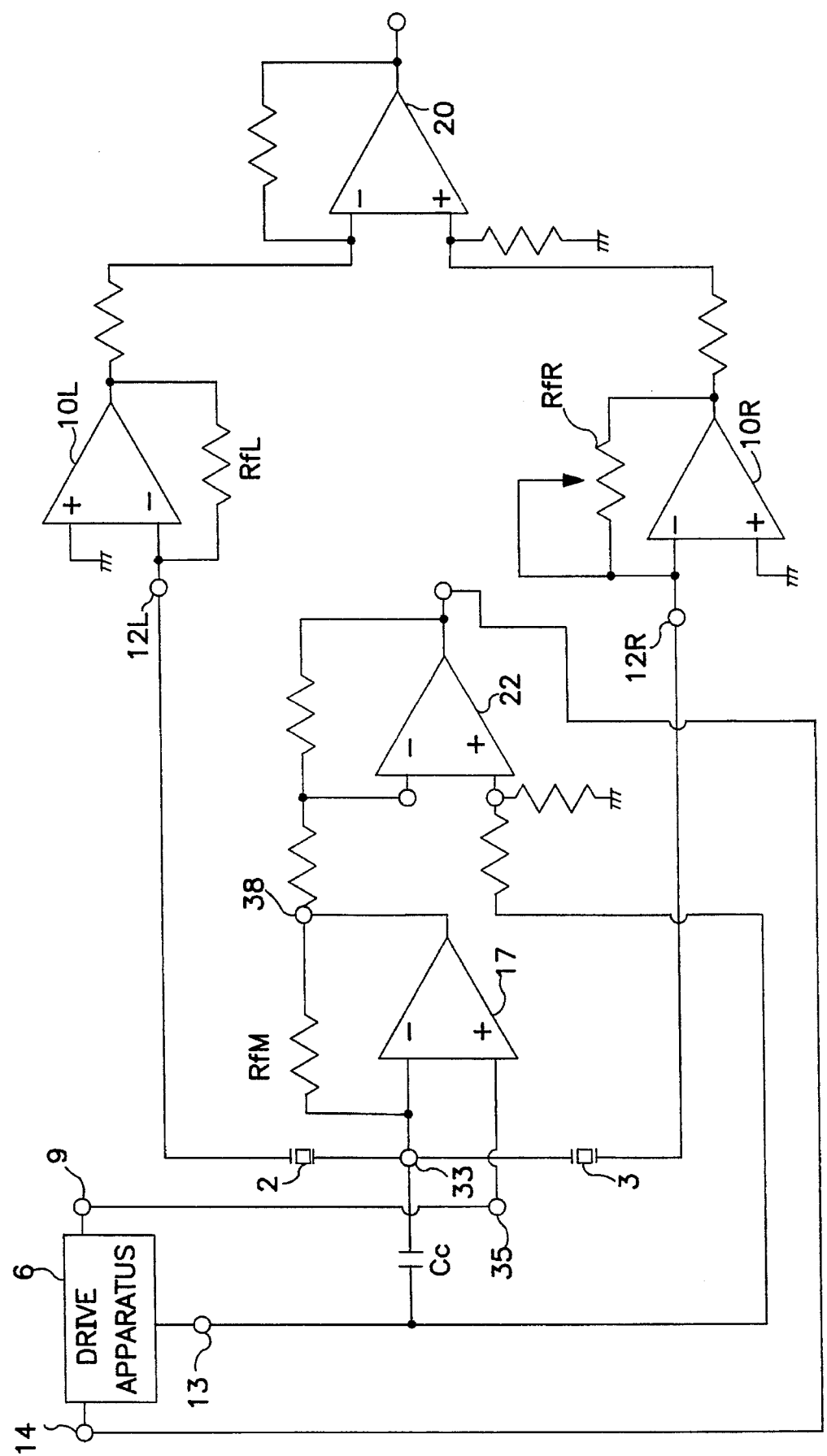
FIG. 3 illustrates Example 3 of the invention.

FIG. 3 illustrates Example 3 of the invention. This example differs from Example 1 in that the drive apparatus 6 has a compensation signal output terminal 13. A compensation signal for the damping capacity of vibrator 4 is outputted at the compensation signal output terminal 13. The compensation signal output terminal 13 is connected via capacitor Cc to feedback input terminal 33 of the third feedback amplifier 17. The compensation signal is combined with the signals of the other electrodes of piezo-electric elements 2 and 3 and is also supplied to the non-inverting input terminal of differential amplifier 22 instead of the drive signal. The capacitor Cc preferably has a temperature dependence corresponding to the temperature dependence of damping capacities Cd of vibrator 4.

Figure 4:
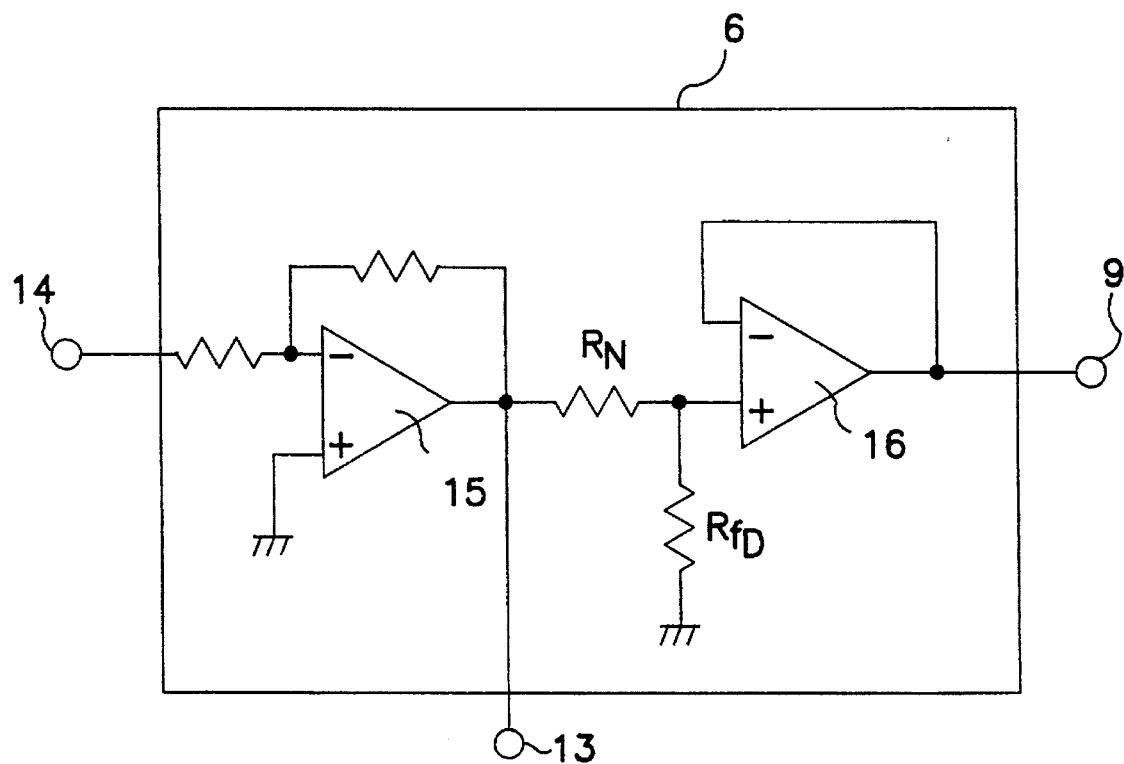
FIG. 4 illustrates an example of the drive apparatus shown in FIG. 3.

FIG. 4 shows an example of the drive apparatus 6 having compensation signal output terminal 13 as shown in FIG. 3. This drive apparatus 6 has inverting amplifier 15 and non-inverting amplifier 16. The signal from input terminal 14 is amplified by inverting amplifier 15. The output of inverting amplifier 15 is supplied as a Compensation signal to compensation signal output terminal 13, as well as being amplified at non-inverting amplifier 16 and supplied as the drive signal to signal output terminal 9. In this example, the drive signal supplied to signal output terminal 9 is made in-phase with the compensation signal supplied to compensation signal output terminal 13. The amplitude ratio of these signals can be set appropriately by the combination of resistances $R_N$ and $Rf_D$ on the input terminal side of non-inverting amplifier 16.

Figure 5A:
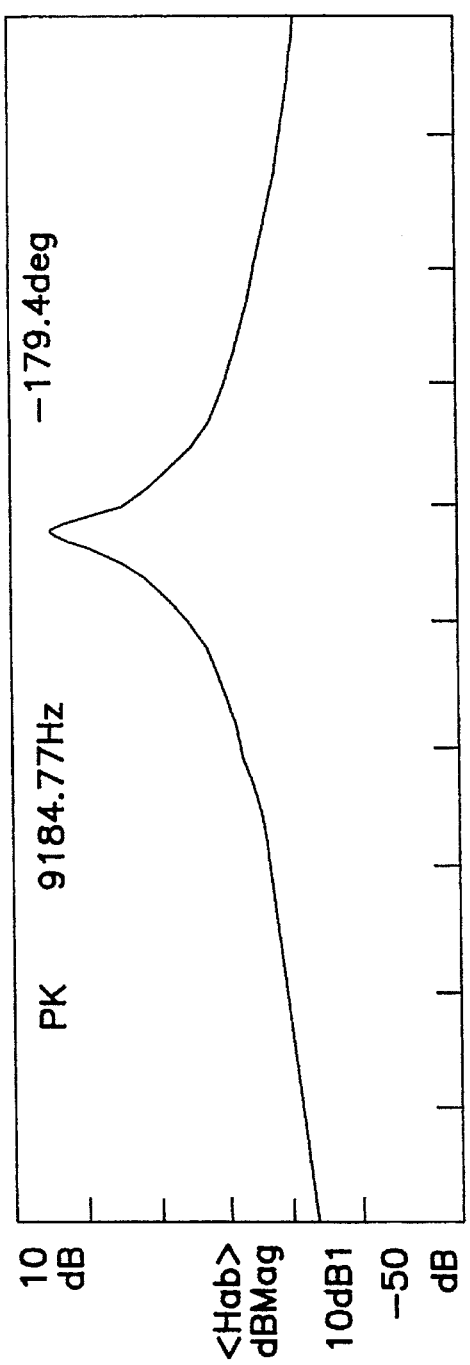
FIGS. 5A and B illustrate examples of measurements of transmission and phase characteristics for Example 3.
Figure 5B:
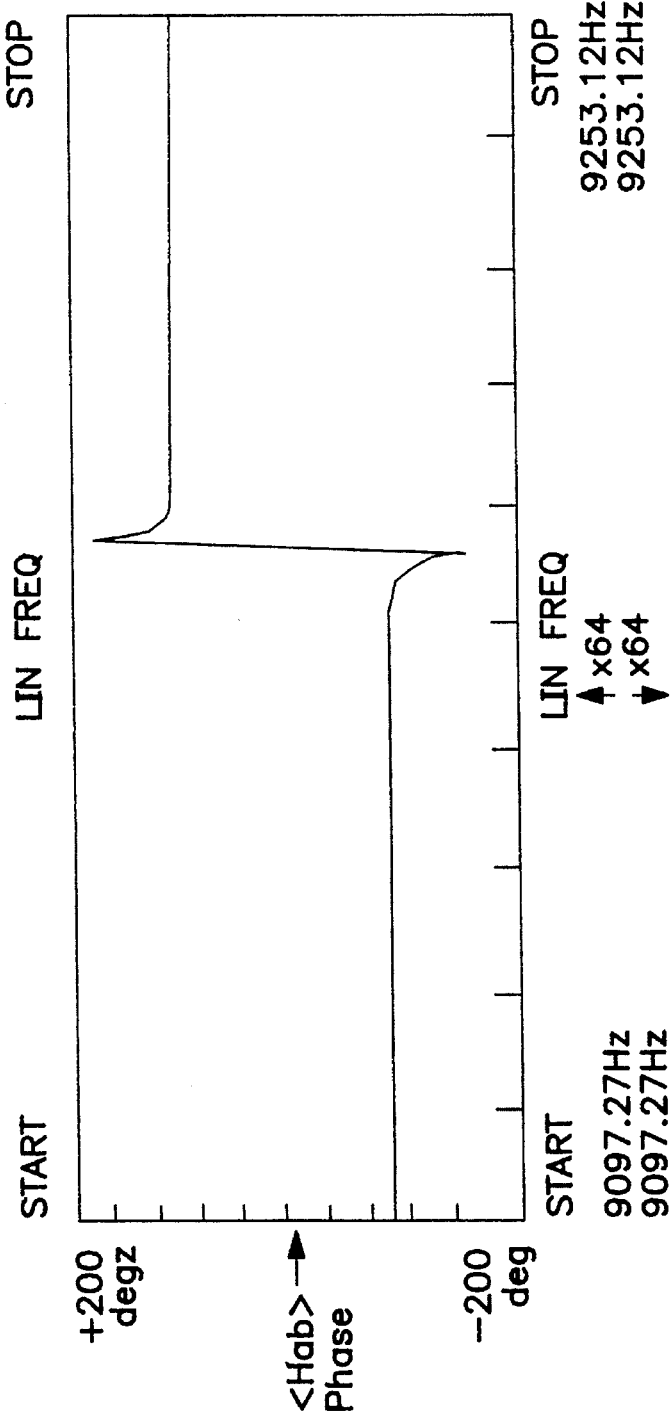
Figure 20A:
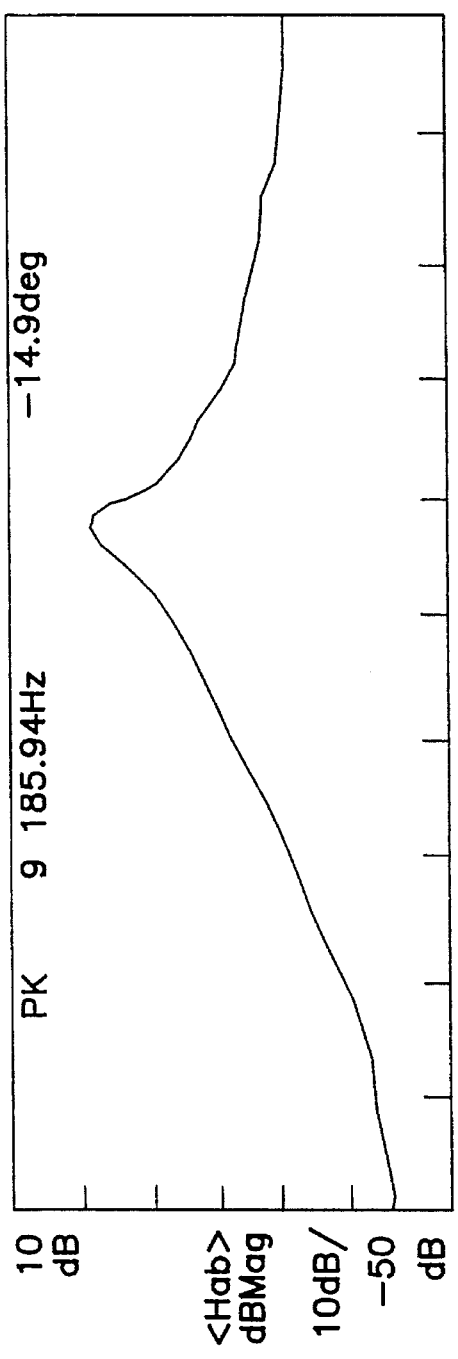
FIG. 20A and 20B illustrate examples of measurements of the transfer and phase characteristics in a conventional system.
Figure 20B:
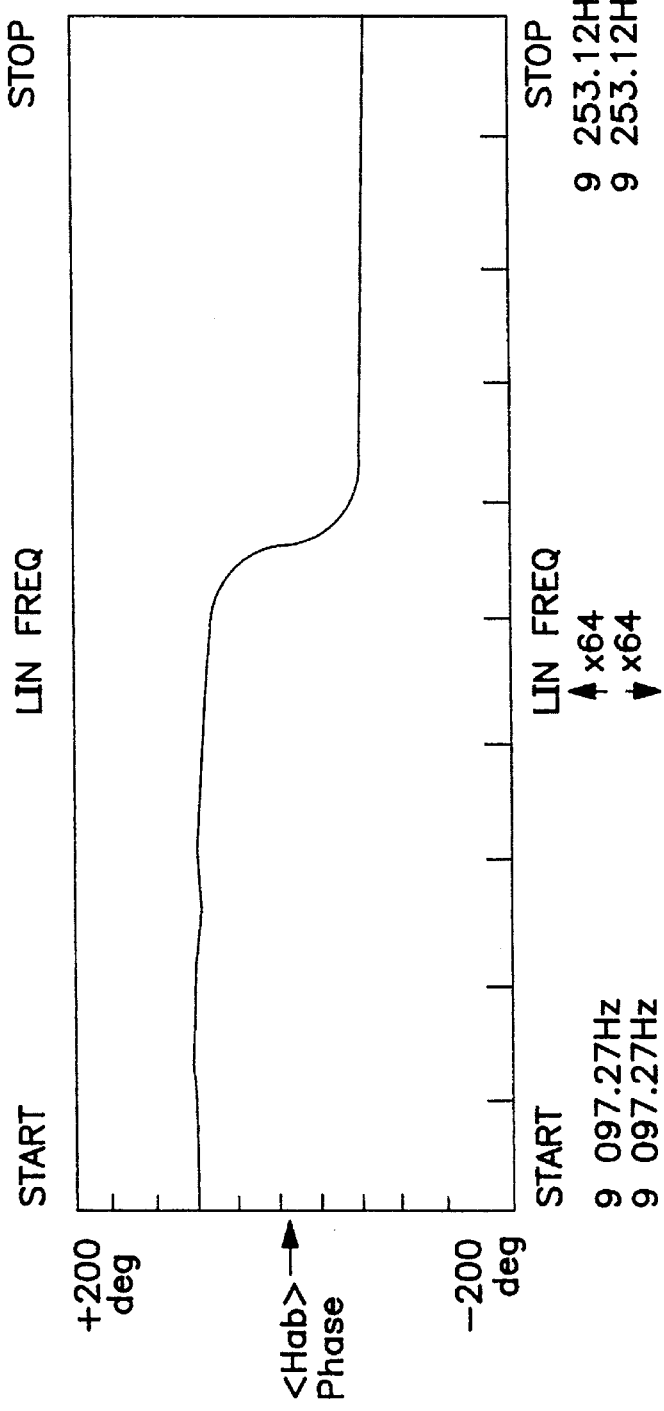
Figure 21:
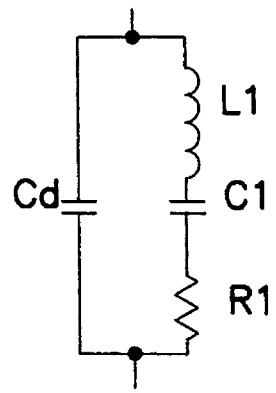
FIG. 21 illustrates the equivalent circuit of the vibrator.

FIGS. 5A and B illustrate results of measurements of transfer and phase characteristics of the output of differential amplifier 22 in FIG. 3, using the same vibrator as used in FIG. 19 and FIG. 20.

As shown in FIG. 3, the imaginary part of the current relative to the respective damping capacities Cd in the current flowing in piezo-electric elements 2 and 3 is extinguished by the compensation signal combined via capacitor Cc. Only the real part of the current flowing in piezo-electric elements 2 and 3 flows in the feedback resistance $Rf_M$ of the third feedback amplifier 17. Consequently, as will be apparent from the measurement results shown in FIGS. 5A and B, the voltage gain of the differential amplifier 22 maximizes at the mechanical series resonance frequency $f_s$ of vibrator 4, so that vibrator 4 can be given self-induced vibration stabilized at a frequency that accurately agrees with the mechanical series resonance frequency $f_s$. Also, the self-induced vibration at the mechanical series resonance frequency $f_s$ can be further stabilized by using a capacitor Cc having a temperature dependence corresponding to the temperature dependence of the damping capacities Cd of vibrator 4.

Figure 6:
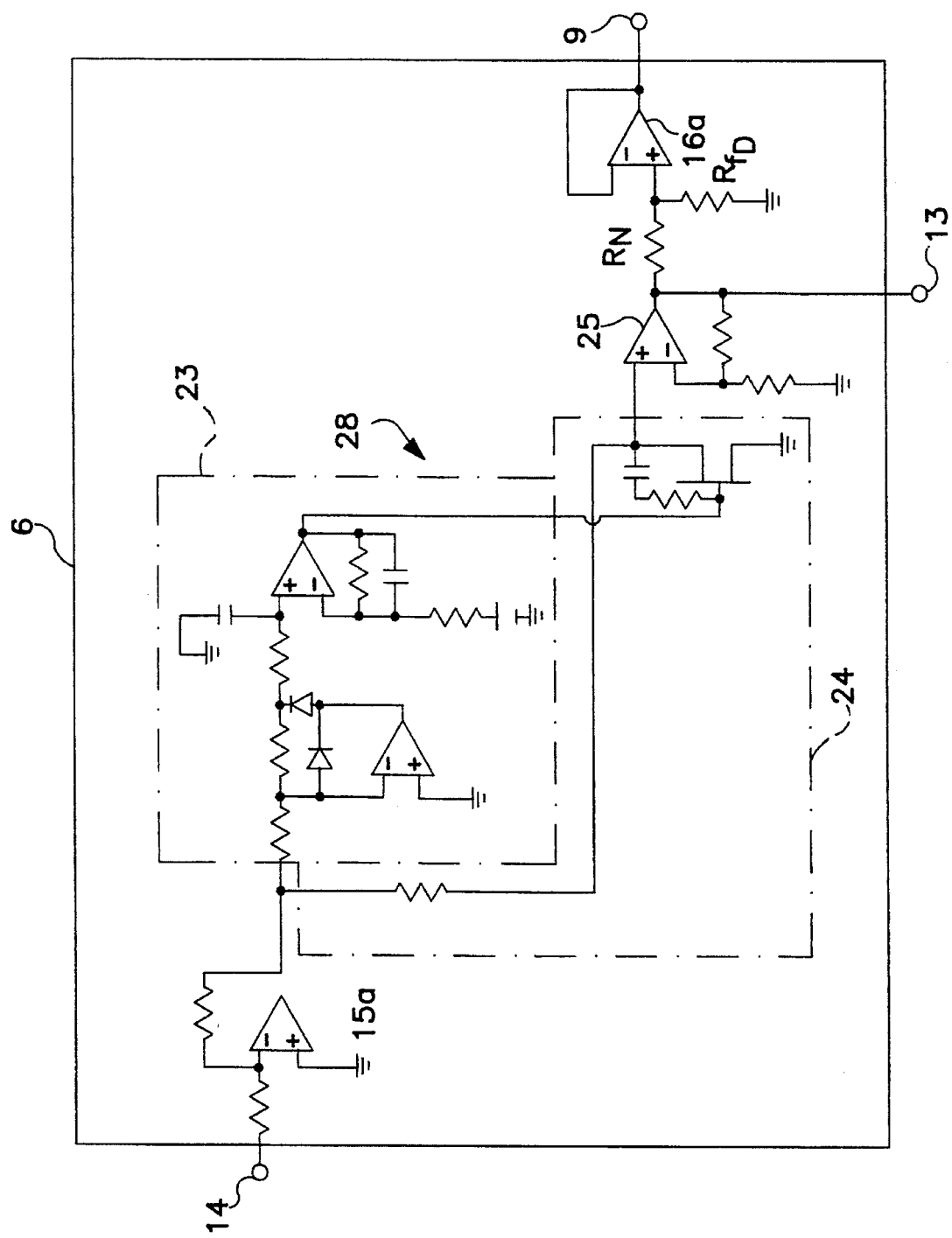
FIG. 6 illustrates another example of drive apparatus shown in FIG. 3.

FIG. 6 illustrates another example of drive apparatus 6 shown in FIG. 3. This drive apparatus 6 has inverting amplifier 15a, automatic gain control circuit ("AGC" circuit) 28 and non-inverting amplifiers 25 and 16a. The input signal from input terminal 14 is supplied to AGC circuit 28 after inverse amplification at inverting amplifier 15a. AGC circuit 28 comprises a comparator 23 and vibration controller 24. At comparator 23 the signal from inverting amplifier 15a becomes direct current and is compared to a reference level. A direct current signal that corresponds to the comparison result is produced and supplied to vibration controller 24. Vibration controller 24 may comprise an FET. An input signal from inverting amplifier 15a is supplied to the source and drain paths of the FET. The output from comparator 23 is supplied to the gate of the FET. The amplitude of the signal from inverting amplifier 15a is controlled based on the output of comparator 23. Further, AGC circuit 28 is not restricted to this example and can, for example, be constructed using an integrated multiplier.

The signal having its amplitude controlled by AGC circuit 28 is amplified to a predetermined value by non-inverting amplifier 25. The output of non-inverting amplifier 25 is supplied as a compensation signal to compensation signal output terminal 13 and amplified by non-inverting amplifier 16a. The output of non-inverting amplifier 16a is supplied as a drive signal to signal output terminal 9. As shown in FIG. 4, the drive signal supplied to signal output terminal 9 is made in-phase with the compensation signal supplied to compensation signal output terminal 13, while their amplitude ratio can be suitably set by a combination of resistances $R_N$ and $Rf_N$ on the input terminal side of non-inverting amplifier 16a.

An increase or decrease in the equivalent resistances of piezo-electric elements 2 and 3 in FIG. 3, which result from changes in ambient temperature, causes the combined current flowing through piezo-electric elements 2 and 3 to decrease or increase. When the output of differential amplifier 22 which is fed back to input terminal 14 of drive apparatus 6 decreases or increases, the output of comparator 23 falls or rises and the resistance between the source and drain of the FET of amplitude controller 24 increases or decreases. Thus, the size of the signal supplied to non-inverting amplifier 25 increases or decreases until the signal input to comparator 23 reaches a fixed value corresponding to the reference level. As a result, the output of differential amplifier 22, i.e., the combined current flowing in piezo-electric elements 2 and 3, is held fixed.

Thus, current flowing through feedback resistance $Rf_M$ of the third feedback amplifier 17, i.e., the combined current flowing through piezo-electric elements 2 and 3 from which current corresponding to the damping capacity has been subtracted, is held fixed. The equivalent resistance of the self-induced vibration direction of vibrator 4 is held apparently fixed. Consequently, the equivalent resistances corresponding to vibration in the sensitivity direction of vibrator 4, having the same piezo-electric elements 2 and 3, are held apparently fixed, so that the detection sensitivity for input angular velocity is fixed regardless of changes in ambient temperature, thereby making highly accurate detection possible.

Furthermore, in the case of the drive apparatus 6 shown in FIG. 6, besides using the method of stabilizing the self-induced vibration by using a capacitor Cc that has a temperature dependence corresponding to the temperature dependence of damping capacities Cd in vibrator 4, it is also possible to use a capacitor Cc as a fixed value, i.e., where resistance $Rf_D$ on the input side of non-inverting amplifier 16a includes negative characteristic thermistors. It is also possible to stabilize self-induced vibration further by changing the output of non-inverting amplifier 16a, so that it does not correspond to the temperature dependence of damping capacities Cd of vibrator 4.

In this example, when damping capacity Cd in vibrator 4 increases or decreases because of changes in ambient temperature, the current flowing through the damping capacity side of vibrator 4 increases or decreases accordingly. Therefore, the voltage gain of non-inverting amplifier 16a decreases or increases and the current flowing through damping capacity Cd of vibrator 4 becomes equal to the current supplied from compensation signal output terminal 13 via capacitor Cd and is extinguished. Furthermore, the temperature dependencies of the currents respectively flowing through the equivalent resistance sides and the damping capacity sides of vibrator 4 have similar tendencies, so that the amount of increase or decrease in the current flowing through the equivalent resistance sides is also suppressed and amplitude changes in the signal fed back to input terminal 14 of drive apparatus 6 are suppressed to a low degree.

Consequently, changes in the output of comparator 23 caused by temperature changes and the amount of change in the resistance between the source and drain of the FET of amplitude controller 24 become small. As a result, the changes in current also become small over a wide range of temperatures. Even under wide changes in the equivalent resistances of vibrator 4, it is possible to expand the operational range of AGC circuit 28 substantially and self-induced vibration can be made more stabilized.

Figure 7:
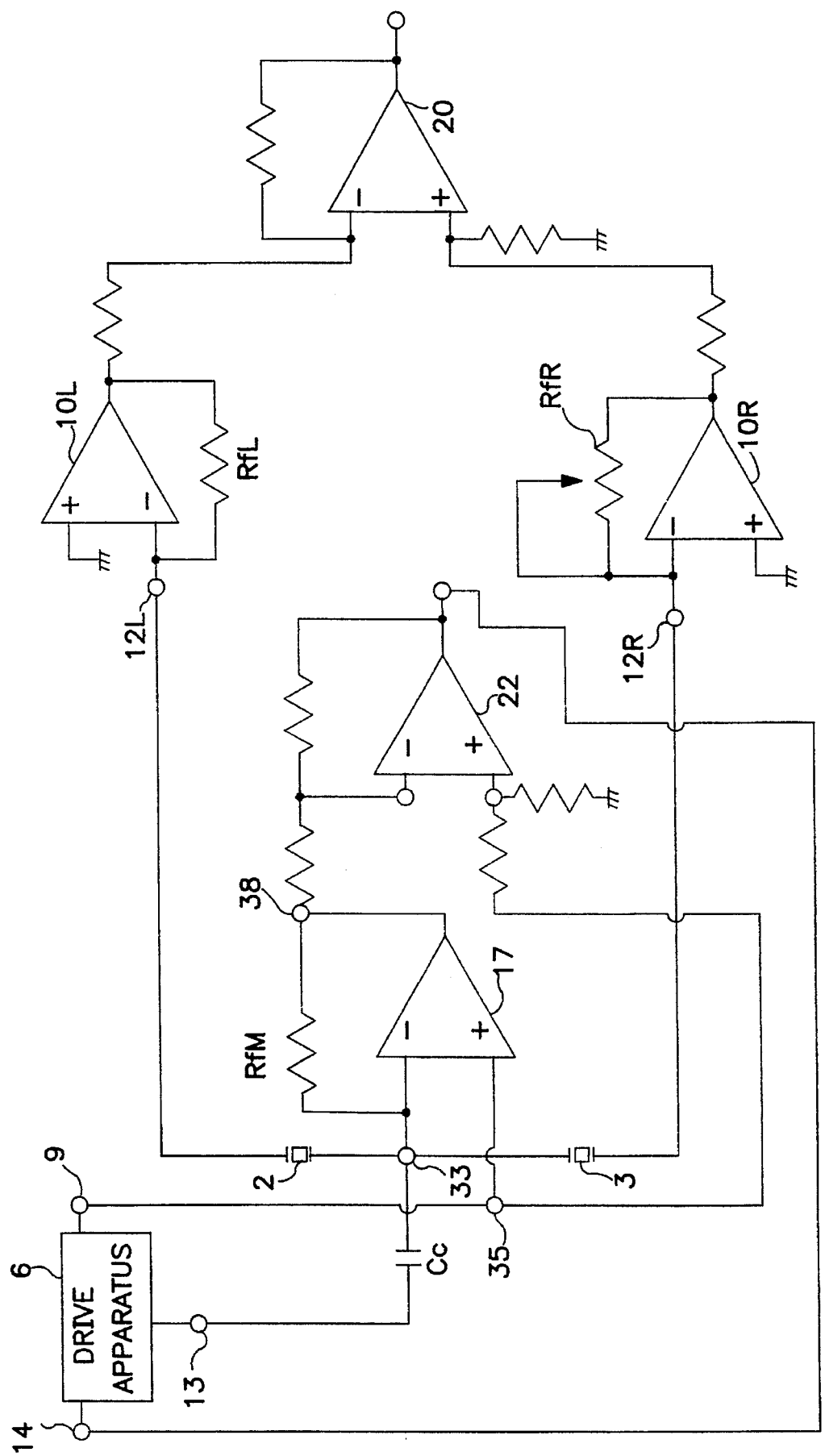
FIG. 7 illustrates Example 4 of the invention.

FIG. 7 illustrates Example 4 of the invention. This example is similar to FIG. 3 except that the output of the third feedback amplifier 17 and the drive signal from the signal output terminal 9 are supplied to differential amplifier 22. Their differential outputs are fed back to input terminal 14 of drive apparatus 6. Further, drive apparatus 6 is as shown in FIG. 4 and has the AGC circuit 28 shown in FIG. 6.

According to FIG. 7, as in Example 3, the imaginary part of the current relative to the respective damping capacities Cd within the currents flowing in piezo-electric elements 2 and 3 is extinguished by the compensation signal combined through capacitor Cc. Therefore, only the real parts of the currents flowing in piezo-electric elements 2 and 3 flow in feedback resistance $Rf_M$ of third feedback amplifier 17. Consequently, the voltage gain of differential amplifier 22 reaches its maximum at the mechanical series resonance frequency $f_s$ of vibrator 4, thereby, making it possible to impart self-induced vibration by stabilizing vibrator 4 at a frequency in accurate agreement with its mechanical series resonance frequency $f_s$.

Figure 8:
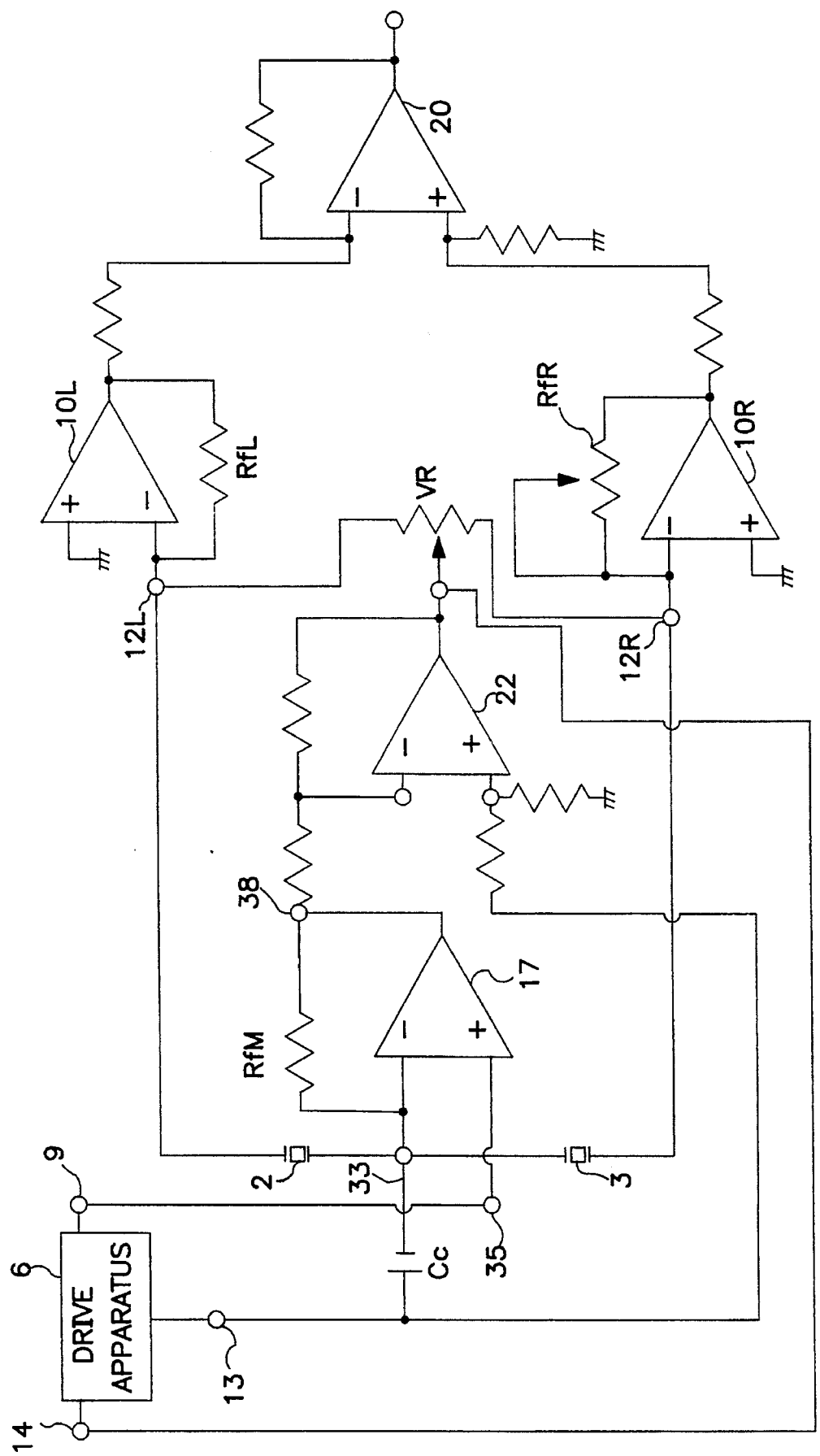
FIG. 8 illustrates Example 5 of the invention.

FIG. 8 illustrates Example 5 of the invention. This example is similar to FIG. 3 except that the output of differential amplifier 22 is input, via variable resistance VR, to the feedback input terminals 12L and 12R of feedback amplifiers 10L and 10R. The output of differential amplifier 22 differs in phase from the drive signal from the drive apparatus 6 by 180°. Minute differences in the equivalent resistances of piezo-electric elements 2 and 3 are compensated for variable resistance VR. The output of differential amplifier 22 then flows to feedback input terminals 12L and 12R as current corresponding to the current flowing in the equivalent resistances of piezo-electric elements 2 and 3. Furthermore, this drive apparatus 6 as shown in FIG. 4 uses the AGC circuit 28 shown in FIG. 6.

In this example, it is possible to have self-induced vibration at vibrator 4 by stabilizing at a frequency in accurate agreement with its mechanical series resonance frequency $f_s$. The mutual equivalent circuit differences of piezo-electric elements 2 and 3 are also compensated for at the first and second feedback amplifiers 10L and 10R. Therefore, only current corresponding to the Coriolis force, i.e, the imaginary part of the current, flows in feedback resistance $Rf_L$ and variable feedback resistance $Rf_R$ of the first and second feedback amplifiers 10L and 10R. Furthermore, the current of imaginary number components flowing in feedback resistance $Rf_L$ and variable feedback resistance $Rf_R$ can compensate for the mutual damping capacity differences in piezo-electric elements 2 and 3 by adjustment of variable feedback resistance $Rf_R$, so that they become mutually equal when there is no angular velocity. Consequently, it is possible to suppress formation of low voltage in the output of differential amplifier 20 to a very low degree and to detect angular velocity with higher accuracy.

Figure 9A:
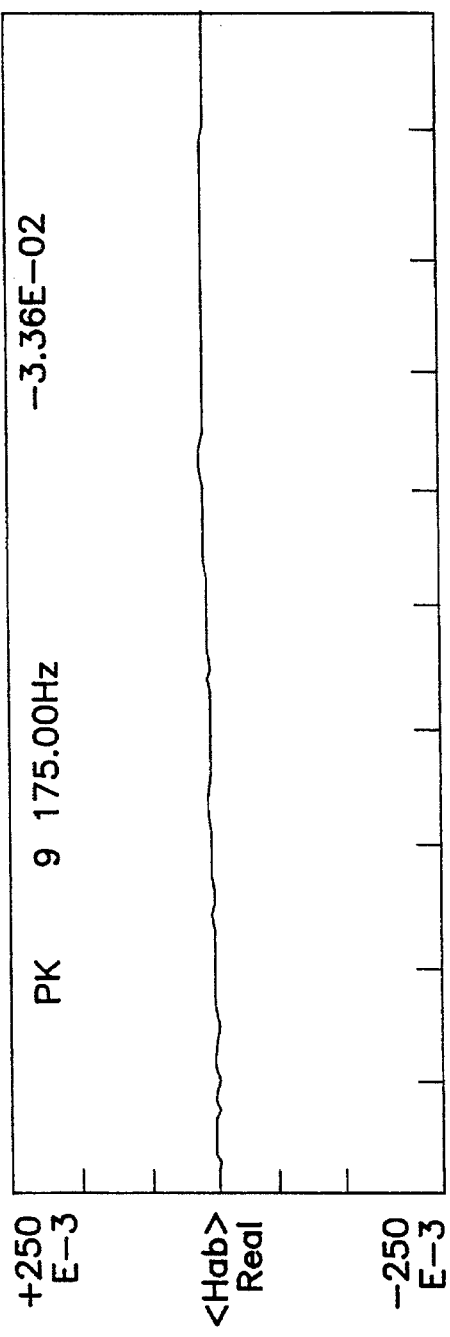
FIGS. 9A and 9B illustrate examples of measurements of transmission and phase characteristics for Example 5.
Figure 9B:
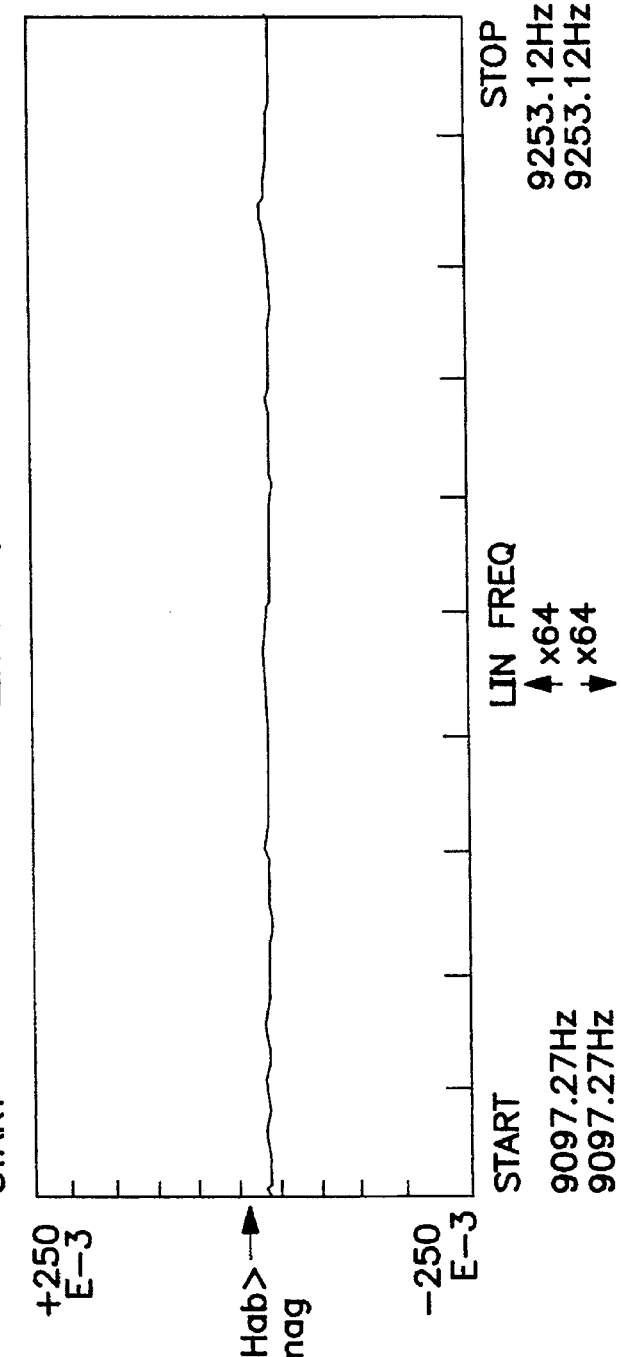

FIGS. 9A and 19 B illustrate results of measurements of the transfer characteristics of the imaginary part of the current and the real part of the current in the output of feedback amplifier 10L in FIG. 8, using the same vibrator used in FIG. 19 and FIG. 20.

According to FIG. 8, the current flowing from differential amplifier 22 to feedback input terminals 12L and 12R of feedback amplifiers 10L and 10R changes in correspondence to the currents flowing in the equivalent resistances of piezo-electric elements 2 and 3 and according to their temperature dependencies. Consequently, as will be apparent from FIGS. 9A and B, even under changes in ambient temperature, only current corresponding to the Coriolis force, i.e., the imaginary part of the current, will constantly flow in feedback resistances $Rf_L$ and $Rf_R$ of feedback amplifiers 10L and 10R, with no flow of the real part of the current. Therefore, it is possible to effectively reduce formation of low voltage and its variations, while also being able to amplify the phase corresponding to input angular velocity more effectively. Consequently, it is possible to detect the angular velocity at higher accuracy than in FIG. 3.

Figure 10:
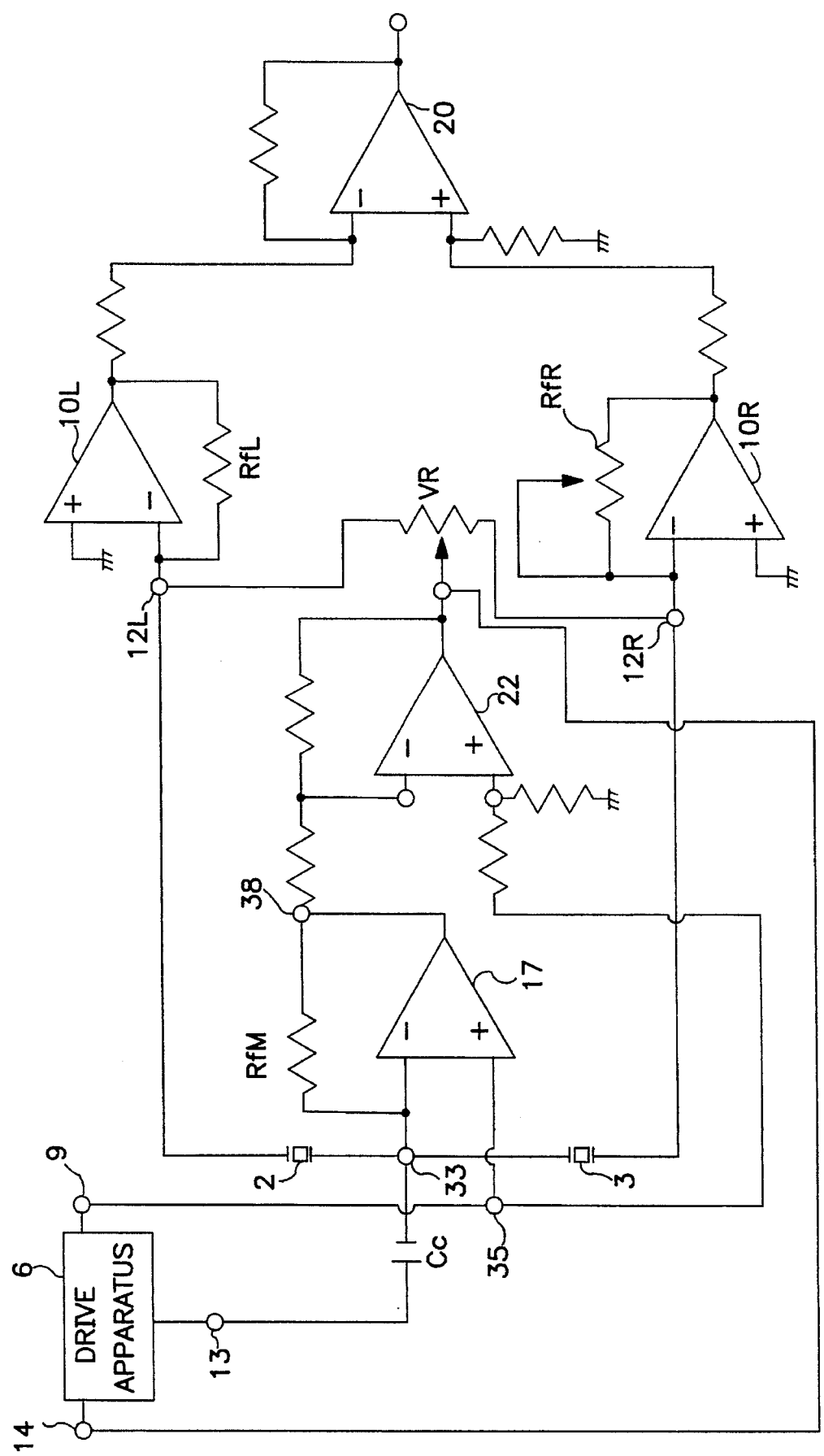
FIG. 10 illustrates Example 6 of the invention.
Figure 11:
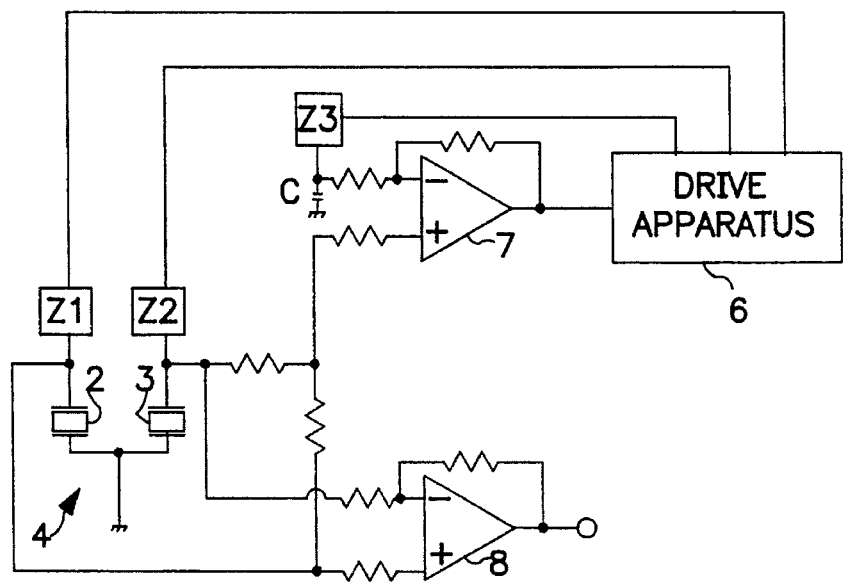
FIG. 11 illustrates a conventional vibrating gyroscope.
Figure 12:
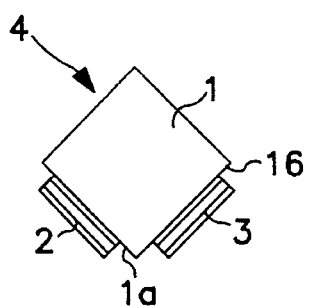
FIGS. 12 to 17 illustrate examples of vibrators usable in the invention.
Figure 13:
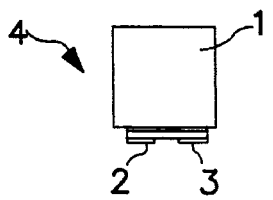
Figure 14:
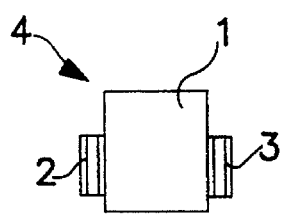
Figure 15:
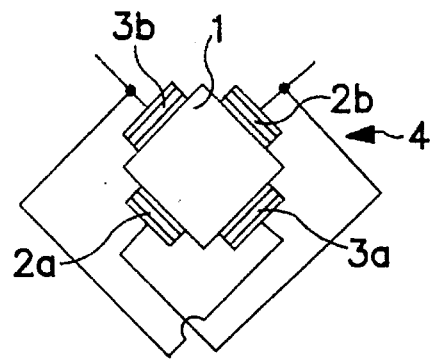
Figure 16:
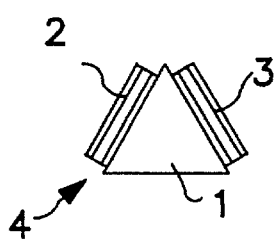
Figure 17:
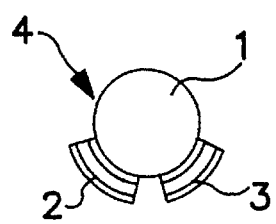
Figure 18:
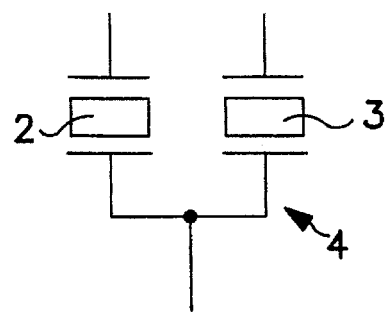
FIG. 18 illustrates an equivalent representation of the vibrator.

FIG. 10 illustrates Example 6 of the invention. This example is similar to FIG. 8 except that the output of the third feedback amplifier 17 and the drive signal from signal output terminal 9 are supplied to differential amplifier 22. The output of differential amplifier 22 is fed back to input terminal 14 of drive apparatus 6. Further, drive apparatus 6 as shown in FIG. 4 uses the AGC circuit 28 shown in FIG. 6. Consequently, in this example, it is also possible to impart self-induced vibration to vibrator 4 by stabilizing at a frequency in accurate agreement with its mechanical series resonance frequency $f_s$ in the same manner as in FIG. 8. It is also possible to suppress formation of low voltage in the output of differential amplifier 20 to a very low degree and to detect angular velocity at higher accuracy.

Further, drive apparatus 6, shown in FIG. 1 and FIG. 2, can be used in FIG. 4 or FIG. 6 with compensation signal output terminal 13 eliminated. Although operational amplifiers were used as feedback amplifiers 10L and 10R in each of the examples described above, other types of feedback amplifiers may also be used. This invention is not restricted to vibrating gyroscopes but can also be applied as a vibration control apparatus in various vibrators.

As described above, by following the first embodiment of the invention, the signal fed back to the drive apparatus can be maximized at a frequency in near agreement with the mechanical series resonance frequency of the vibrator, so that the vibrator can be given self-induced vibration at a frequency in near agreement with the mechanical series resonance frequency.

In the second embodiment of the invention, the signal fed back to the drive apparatus is also supplied to the feedback input terminals of the first and second feedback amplifiers. Therefore, besides being able to give self-induced vibration to the vibrator at nearly its self-induced vibration frequency, the equivalent resistance difference of the pair of piezo-electric elements is compensated for and the difference in outputs of the first and second feedback amplifiers, i.e., low voltage, can be effectively reduced. When used with a vibrating gyroscope, it is possible to effectively-amplify the phase component in correspondence with the input angular velocity and to detect angular velocity at high accuracy.

In the third embodiment of the invention, the signal fed back to the drive apparatus can be maximized at a frequency in accurate agreement with the mechanical series resonance frequency of the vibrator by compensating for the damping capacities of the pair of piezo-electric elements. It is, therefore, possible to give self-induced vibration to the vibrator at a frequency in accurate agreement with its mechanical series resonance frequency.

In the apparatus of the fourth embodiment of the invention, the signal fed back to the drive apparatus is also supplied to the feedback input terminals of the first and second feedback amplifiers. Besides being able to give self-induced vibration to the vibrator at a frequency in accurate agreement with its mechanical series resonance frequency, it is possible to compensate for the equivalent resistance difference in the pair of piezo-electric elements and effectively decrease the difference in the outputs of the first and second feedback amplifiers, i.e., low voltage. Therefore, when used in a vibrating gyroscope, the apparatus can effectively amplify the phase component corresponding to input angular velocity and detect angular velocity at higher accuracy.

Figure 22:
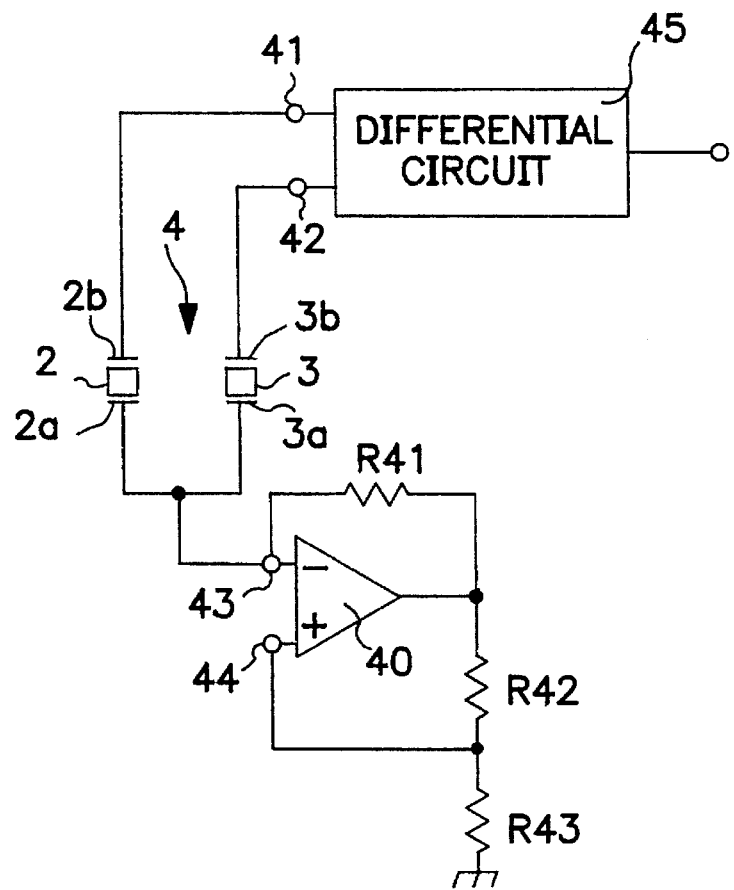
FIGS. 22 and 23 illustrate examples of a low cost, simple, miniaturized apparatus of the invention.

FIG. 22 illustrates an example of the invention which is low cost, simple and miniaturized. The vibrator 4 is formed of at least two piezo-electric elements 2 and 3 on the side surfaces of vibration member 1 having various cross-sectional shapes and having a resonance point. Electrodes 2a and 3a of piezo-electric elements 2 and 3 are connected in common to inverting input terminal 43 of operational amplifier 40 which forms the drive circuit for the purpose of imparting self-induced vibration. Operational amplifier 40 has an amplification function which depends on feedback resistance R41. Its output is split by resistances R42 and R43 so that a portion is supplied to non-inverting input terminal 44. Also, the other electrodes 2b and 3b of piezo-electric elements 2 and 3 are connected to input terminals 41 and 42 of differential circuit 15 which forms a detection circuit.

Vibration member 1 of vibrator 4 can be made of materials such as metals like Elinvar or quartz, ceramic or glass. When vibration member 1 is made of a conductive material such as metal, the pair of piezo-electric elements 2 and 3 uses the electrodes on one side of vibration member 1 for self-induced vibration and uses the electrodes on the other side for detection. When vibration member 1 is made of an insulating material such as quartz, ceramic or glass, the pair of piezo-electric elements 2 and 3 may have any two of their electrodes used for self-induced vibration and the remaining two used for detection.

In the vibrating gyroscope illustrated in FIG. 22, when the impedance of vibrator 4 decreases in the vicinity of the series resonance frequency, the amplification degree of operational amplifier 40 increases. As a result, the signal applied to non-inverting input terminal 44 increases so that vibrator 4 is given self-induced vibration at a phase angle of 0°.

On the other hand, when input angular velocity acts on vibrator 4, the currents flowing through piezo-electric elements 2 and 3 change accordingly and the difference in these currents is output as voltage at differential circuit 45. Consequently, it becomes possible to detect the size of the input angular velocity acting on vibrator 4, based on the output of differential circuit 45.

Figure 23:
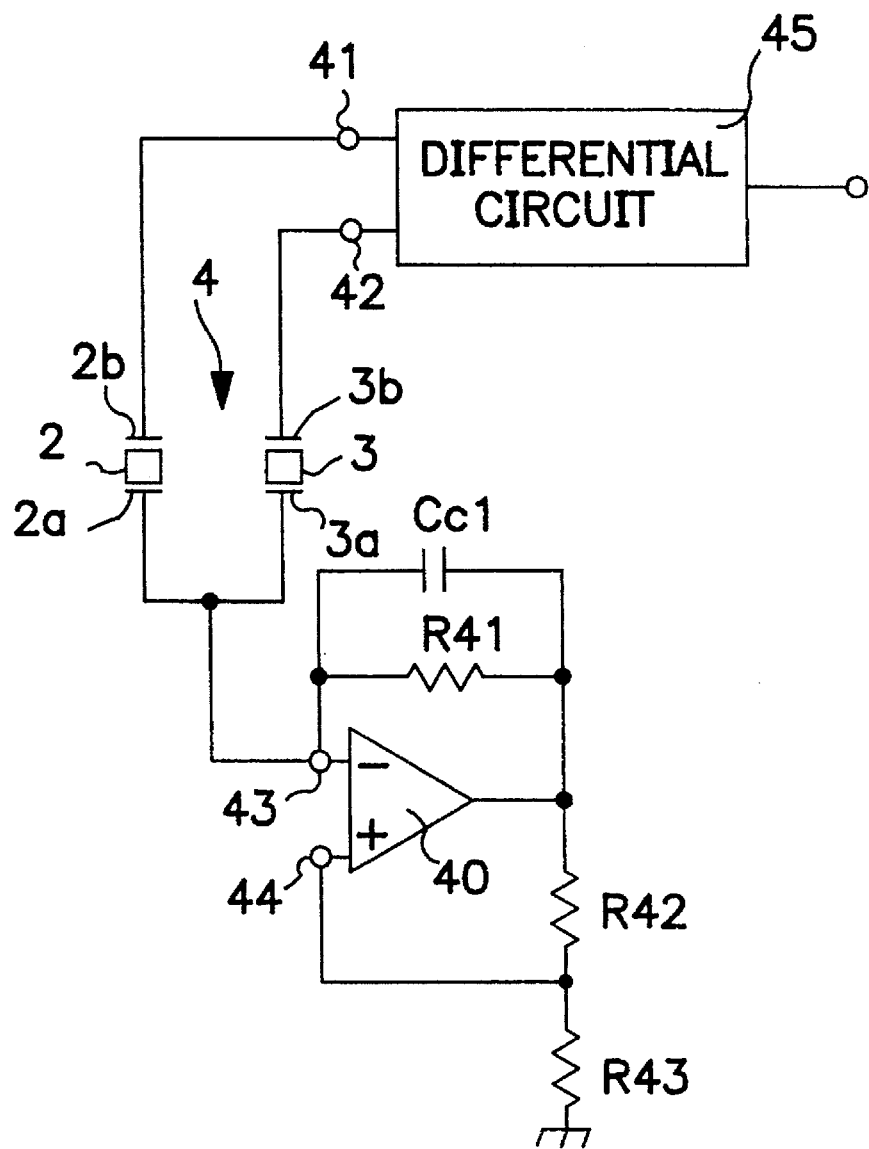

FIG. 23 illustrates another example of a low cost, simple and miniaturized apparatus. This example is similar to FIG. 22 except that capacitor Cca, which compensates for changes in oscillation frequency from the damping capacity of vibrator 4, is connected in parallel with feedback resistance R41 of operational amplifier 40.

Accordingly, the current of the imaginary number component flowing in feedback resistance R41 can be extinguished by capacitor Cca because of the damping capacity of vibrator 4, so that vibrator 4 can be given self-induced vibration accurately at the series resonance frequency.

According to the present invention, one each of the electrodes of a pair of piezo-electrodes of the vibrator are connected to a drive circuit for imparting self-induced vibration to the vibrator. The other electrodes are connected to a detection circuit for detecting angular velocity, making it possible to cut down on the number of circuit parts and to obtain miniaturized vibrating gyroscopes with simplicity and low cost.

Finally, the above-described embodiments of the present invention are intended to be illustrative only. Numerous alternative embodiments may be devised by those skilled in the art without departing from the spirit and scope of the following claims.

I claim:

1. Vibration control apparatus comprising:
   (a) a vibrator having a vibration member having at least one side surface with a resonance point,
   (b) first and second piezo-electric elements on said side surface, each of said piezo-electric elements having first and second electrodes,
   (c) a drive apparatus having a signal output terminal to output a vibrator drive signal and a signal input terminal,
   (d) first and second feedback amplifiers, each of said feedback amplifiers having a feedback input terminal, and
   (e) a third feedback amplifier having a feedback input terminal, a signal input terminal and a signal output terminal,
   wherein said feedback input terminal of said first feedback amplifier is connected to said first electrode of said first piezo-electric element and the feedback input terminal of said second feedback amplifier is connected to said first electrode of said second piezo-electric element, said feedback input terminal of said third feedback amplifier is connected to said second electrode of said first piezo-electric element and to said second electrode of said second piezo-electric element, said signal input terminal of said third feedback amplifier is connected to said signal output terminal of said drive apparatus, and said signal output terminal of said third feedback amplifier is connected to said signal input terminal of the drive apparatus, so that a signal based on an output signal of said third feedback amplifier is fed back to said drive apparatus.

2. The vibration control apparatus of claim 1, wherein said signal based on the output signal of said third feedback amplifier is formed by combining the output signal of said third feedback amplifier with said drive signal.

3. The vibration control apparatus of claim 1, wherein said signal based on the output signal of said third feedback amplifier is supplied to said feedback input terminal of said first feedback amplifier and to said feedback input terminal of said second feedback amplifier via a variable resistance and wherein at least one feedback resistance of said first and second feedback amplifiers has a variable feedback resistance.

4. The vibration control apparatus of claim 1, further comprising a differential amplifier that detects differences in outputs of said first and second feedback amplifiers.

5. Vibration control apparatus comprising:
   (a) a vibrator having a vibration member having at least one side surface with a resonance point,
   (b) first and second piezo-electric elements on said side surface, each of said piezo-electric elements having first and second electrodes,
   (c) a drive apparatus having a signal output terminal that outputs a vibrator drive signal and a signal input terminal,
   (d) first and second feedback amplifiers, each of said feedback amplifiers having a feedback input terminal, and
   (e) a third feedback amplifier having a feedback input terminal, a signal input terminal and a signal output terminal,
   wherein said feedback input terminal of said first feedback amplifier is connected to said first electrode of said first piezo-electric element, said feedback input terminal of said second feedback amplifier is connected to said first electrode of said second piezo-electric element, said feedback input terminal of said third feedback amplifier is connected to said second electrode of said first piezo-electric element and to said second electrode of said second piezo-electric element, said signal input terminal of said third feedback amplifier is connected to said signal output terminal of said drive apparatus, and said signal output terminal of said third feedback amplifier is connected to said signal input terminal of the drive apparatus, so that a signal based on an output signal of said third feedback amplifier is fed back to said drive apparatus and is supplied to said feedback input terminals of said first and second feedback amplifiers.

6. The vibration control apparatus of claim 5, wherein said signal based on the output signal of said third feedback amplifier is supplied to the feedback input terminals of said first and second feedback amplifiers via a variable resistance and at least one feedback resistance of said first and second feedback amplifiers has a variable feedback resistance.

7. The vibration control apparatus of claim 5, further comprising a differential amplifier that detects differences in outputs of said first and second feedback amplifiers.

8. The vibration control apparatus of claim 5, wherein said signal based on the output signal of said third feedback amplifier is formed by combining the output signal of said third feedback amplifier with said drive signal.

9. Vibration control apparatus comprising (a) a vibrator having a vibration member having at least one side surface with a resonance point, (b) first and second piezo-electric elements on said side surface, each piezo-electric element having first and second electrodes, (c) a drive apparatus having a signal output terminal that outputs a vibrator drive signal, a compensation signal output terminal that outputs a compensation signal for damping capacity of said vibrator and a signal input terminal, (d) first and second feedback amplifiers, each feedback amplifier having a feedback input terminal, and (e) a third feedback amplifier having a feedback input terminal, a signal input terminal and a signal output terminal, wherein the feedback input terminal of said first feedback amplifier is connected to said first electrode of said first piezo-electric element, the feedback input terminal of said second feedback amplifier is connected to said first electrode of said second piezo-electric element, the feedback input terminal of said third feedback amplifier is connected to the second electrodes of said first and second piezo-electric elements and to the compensation signal output terminal of said drive apparatus, the signal input terminal of said third feedback amplifier is connected to the signal output terminal of said drive apparatus, and the signal output terminal of said third feedback amplifier is connected to said signal input terminal of said drive apparatus, so that a signal based on an output signal of said third feedback amplifier is fed back to said drive apparatus.

10. The vibration control apparatus of claim 9, wherein said signal based on the output signal of said third feedback amplifier is formed by combining the output signal of said third feedback amplifier with said drive signal.

11. The vibration control apparatus of claim 10, wherein an amplitude and a phase of said compensation signal vary in correspondence with a damping capacity value of said vibrator.

12. The vibration control apparatus of claim 9, wherein said signal based on the output signal of said third feedback amplifier is formed by combining the output signal of said third feedback amplifier with said compensation signal.

13. The vibration control apparatus of claim 12, wherein an amplitude and a phase of said compensation signal vary in correspondence with a damping capacity value of said vibrator.

14. The vibration control apparatus of claim 9, wherein an amplitude and a phase of said compensation signal vary in correspondence with a damping capacity value of said vibrator.

15. The vibration control apparatus of claim 9, wherein said signal based on the output signal of said third feedback amplifier is supplied to said feedback input terminal of said first feedback amplifier and to said feedback input terminal of second feedback amplifier via a variable resistance and wherein at least one feedback resistance of said first and second feedback amplifiers has a variable feedback resistance.

16. The vibration control apparatus of claim 9, further comprising a differential amplifier that detects differences in outputs of said first and second feedback amplifiers.

17. Vibration control apparatus comprising:

(a) a vibrator having a vibration member having at least one side surface with a resonance point, (b) first and second piezo-electric elements on said side surface, each of said piezo-electric elements having first and second electrodes, (c) a drive apparatus having a signal output terminal that outputs a vibrator drive signal, a compensation signal output terminal that outputs a compensation signal for a damping capacity of said vibrator and a signal input terminal, (d) first and second feedback amplifiers, each of said feedback amplifiers having a feedback input terminal, and (e) a third feedback amplifier having a feedback input terminal, a signal input terminal and a signal output terminal,
wherein said feedback input terminal of said first feedback amplifier is connected to said first electrode of said first piezo-electric element and said feedback input terminal of said second feedback amplifier is connected to said first electrode of said second piezo-electric element, said feedback input terminal of said third feedback amplifier is connected to said second electrode of said first piezo-electric element, to said second electrode of said second piezo-electric element and to said compensation signal output terminal of said drive apparatus, said signal input terminal of said third feedback amplifier is connected to said signal output terminal of said drive apparatus, and said signal output terminal of said third feedback amplifier is connected to said signal input terminal of said drive apparatus, so that a signal based on an output signal of said third feedback amplifier is fed back to said drive apparatus and supplied to said feedback input terminal of said first feedback amplifier and to said feedback input terminal of said second feedback amplifier.

18. The vibration control apparatus of claim 17, wherein said signal based on the output signal of said third feedback amplifier is formed by combining the output signal of said third feedback amplifier with said drive signal.

19. The vibration control apparatus of claim 18, wherein amplitude and phase of said compensation signal vary in correspondence with said damping capacity value of said vibrator.

20. The vibration control apparatus of claim 17, wherein said signal based on the output signal of said third feedback amplifier is formed by combining the output signal of said third feedback amplifier with said compensation signal.

21. The vibration control apparatus of claim 20, wherein amplitude and phase of said compensation signal vary in correspondence with said damping capacity value of said vibrator.

22. The vibration control apparatus of claim 17, wherein amplitude and phase of said compensation signal vary in correspondence with said damping capacity value of said vibrator.

23. The vibration control apparatus of claim 17, wherein said signal based on said output signal of said third feedback amplifier is supplied to said feedback input terminal of said first feedback amplifier and to said feedback input terminal of said second feedback amplifier via a variable resistance and wherein at least one feedback resistance of said first and second feedback amplifiers has a variable feedback resistance.

24. The vibration control apparatus of claim 17, further comprising a differential amplifier that detects differences in outputs of said first and second feedback amplifiers.

25. A vibrating gyroscope comprising a vibrator having a vibration member having at least one side surface with a resonance point, first and second piezo-electric elements on said side surface, each of said piezo-electric elements having first and second electrodes, a drive circuit, and a detection circuit wherein said first electrode of said first piezo-electric element and said first electrode of said second piezo-electric element are connected to said drive circuit for self-induced excitation of said vibrator and said second electrode of said first piezo-electric element and said second electrode of said second piezo-electric element are connected to said detection circuit for detecting input angular velocity.

* * * * *